US010048508B2

(12) United States Patent
Sue et al.

(10) Patent No.: US 10,048,508 B2
(45) Date of Patent: Aug. 14, 2018

(54) OPTICAL UNIT WITH SHAKE CORRECTION FUNCTION

(71) Applicant: NIDEC SANKYO CORPORATION, Suwa-gun, Nagano (JP)

(72) Inventors: Takeshi Sue, Nagano (JP); Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 0 days.

(21) Appl. No.: 15/201,971

(22) Filed: Jul. 5, 2016

(65) Prior Publication Data
US 2017/0003517 A1 Jan. 5, 2017

(30) Foreign Application Priority Data

Jul. 2, 2015 (JP) .................................. 2015-133681
Jun. 15, 2016 (JP) .................................. 2016-118548

(51) Int. Cl.
*G02B 27/64* (2006.01)
*G02B 7/08* (2006.01)
*H02K 41/035* (2006.01)
*H04N 5/232* (2006.01)

(52) U.S. Cl.
CPC ............. *G02B 27/646* (2013.01); *G02B 7/08* (2013.01); *H02K 41/0356* (2013.01); *G03B 2205/0023* (2013.01); *H02K 2201/18* (2013.01); *H04N 5/23287* (2013.01)

(58) Field of Classification Search
None
See application file for complete search history.

(56) References Cited

U.S. PATENT DOCUMENTS

| 2009/0052037 A1* | 2/2009 | Wernersson | G02B 27/646 359/554 |
| 2015/0277138 A1* | 10/2015 | Yanagisawa | G02B 27/646 359/554 |
| 2015/0277140 A1* | 10/2015 | Minamisawa | G02B 7/023 359/557 |
| 2015/0336211 A1* | 11/2015 | Watanabe | B23K 26/20 359/813 |

(Continued)

FOREIGN PATENT DOCUMENTS

JP 2015064501 A 4/2015

*Primary Examiner* — W B Perkey
(74) *Attorney, Agent, or Firm* — Cantor Colburn LLP

(57) ABSTRACT

An optical unit may include a movable body holding an optical module by a holder, a fixed body having a body part surrounding the movable body, a support mechanism swingably supporting the movable body, and a shake correction drive mechanism that swings the movable body. The holder includes a plurality of wall parts on an outer periphery of the optical module, and the wall part holds a part of the shake correction drive mechanism, and the support mechanism includes a movable frame surrounding the optical module and a plurality of swing support parts supporting the movable frame. The movable frame includes supporting point parts contacting the swing support parts, and connecting parts connecting supporting point parts adjacent to each other. The supporting point parts are located on an outer periphery of wall parts, and the connecting parts are disposed so as to pass on inner sides of the wall parts.

17 Claims, 7 Drawing Sheets

(56) References Cited

U.S. PATENT DOCUMENTS

| | | | |
|---|---|---|---|
| 2016/0170227 A1* | 6/2016 | Minamisawa | G03B 5/00 |
| | | | 359/557 |
| 2016/0231641 A1* | 8/2016 | Minamisawa | H04N 5/2254 |
| 2017/0003517 A1* | 1/2017 | Sue | G02B 7/08 |
| 2017/0017093 A1* | 1/2017 | Minamisawa | G02B 27/646 |
| 2017/0038600 A1* | 2/2017 | Hee | G02B 27/646 |
| 2017/0176766 A1* | 6/2017 | Sue | G02B 27/646 |
| 2017/0176767 A1* | 6/2017 | Yanagisawa | G02B 27/646 |
| 2017/0235155 A1* | 8/2017 | Minamisawa | G02B 7/023 |
| | | | 359/557 |

* cited by examiner

OPTICAL UNIT WITH SHAKE CORRECTION FUNCTION

CROSS REFERENCE TO RELATED APPLICATION

The present invention claims priority under 35 U.S.C. § 119 to Japanese Application No. 2015-133681 filed Jul. 2, 2015, the entire content of which is incorporated herein by reference.

FIELD OF THE INVENTION

At least an embodiment of the present invention may relate to an optical unit with a shake correction function which is mounted on an optical device.

BACKGROUND

Various optical devices on which an optical unit for photographing is mounted have been conventionally used. The optical unit includes a mechanism structured to swing an optical module to correct a shake for restraining disturbance of a photographed image due to a hand shake and a swing. The mechanism includes, as a support mechanism structured to swingably support an optical module with respect to a fixed body, a gimbal mechanism disposed between a movable body and the fixed body. The gimbal mechanism includes two first swing support parts separated from each other in a first axial line direction intersecting an optical axis direction between the movable body and the fixed body, two second swing support parts separated from each other in a second axial line direction intersecting the optical axis direction and the first axial line direction, and a frame-shaped gimbal spring whose four corners are supported by the two first swing support parts and the two second swing support parts. An optical unit with a shake correction function including the gimbal mechanism is disclosed in Japanese Patent Laid-Open No. 2015-64501.

The movable body of the optical unit with a shake correction function disclosed in the above-mentioned Patent Literature includes an optical module having a lens and the like, a holder which holds the optical module, and coils held by the holder on an outer peripheral side of the optical module. The gimbal mechanism is disposed so that the first swing support parts, the second swing support parts and the gimbal spring surround the optical module, and a wall part of the holder holding the coils surrounds the outer peripheral side of the gimbal mechanism. The fixed body includes an outer case which covers the movable body and magnets held by an inner face of a body part of the outer case, and the magnets are located on an outer peripheral side of the coils.

As described above, in a case that the gimbal spring, the coils and the magnets are disposed in an overlapped manner on an outer peripheral side of the optical module, in order to make the optical unit with a shake correction function further thinner in a direction intersecting the optical axis direction of the optical module, the size of the optical module, the thickness of the coil, the thickness of the magnet are required to be reduced. However, reduction of the size and the thickness of these members and the module is limited. Therefore, it is difficult that the size of the optical unit with a shake correction function is further reduced in a direction intersecting the optical axis direction of the optical module and thus the size of the optical unit with a shake correction function is difficult to be reduced.

SUMMARY

In view of the problem described above, at least an embodiment of the present invention may advantageously provide an optical unit with a shake correction function whose size is reduced.

According to at least an embodiment of the present invention, there may be provided an optical unit with a shake correction function including a movable body which holds an optical module by a holder, a fixed body having a body part which surrounds the movable body, a support mechanism which swingably supports the movable body with respect to the fixed body, and a shake correction drive mechanism structured to swing the movable body. The holder includes a plurality of wall parts disposed on an outer peripheral side with respect to the optical module and the wall part holds a part of the shake correction drive mechanism. The support mechanism includes a movable frame which surrounds the optical module and a plurality of swing support parts supporting the movable frame. The movable frame is provided with supporting point parts contacting with the swing support parts and connecting parts connecting the supporting point parts adjacent to each other. The supporting point parts are located on an outer peripheral side with respect to the wall parts and the connecting parts are disposed on inner sides with respect to the wall parts.

According to at least an embodiment of the present invention, the movable frame which swingably supports the movable body is provided with the supporting point parts supported by the swing support parts and the connecting parts connecting the adjacent supporting point parts with each other. The supporting point parts are located on an outer peripheral side with respect to the wall parts, and the connecting part which connects the adjacent supporting point parts with each other is disposed so as to pass through an inner side with respect to the wall part. According to this structure, a space for disposing the supporting point part and the swing support part is not required to secure on an inner side with respect to the wall part. Therefore, the wall parts and the shake correction drive mechanism are capable of being disposed on an inner peripheral side. Accordingly, the size of the entire device can be reduced.

In at least an embodiment of the present invention, the holder is a rectangular holder, the wall parts are extended along respective sides of the rectangular holder, space parts are provided between the wall parts adjacent to each other in a circumferential direction at corner parts of the rectangular holder, and the swing support parts are disposed in the space parts. According to this structure, the swing support parts are capable of being disposed at corner parts of the holder by utilizing the space parts. Therefore, widths of the wall part and the coil or the magnet held by the wall part can be increased. Further, while reducing the size of the entire device, shortening of a peripheral length of the movable frame can be avoided. Therefore, lowering of the support function due to shortening of the peripheral length of the movable frame can be avoided. In this case, for example, in a case that the coil is held by an outer side face of the wall part and the magnet is held by an inner side face of the body part, it is preferable that, when viewed in an optical axis direction of the optical module, both of the outermost side faces of the coil in a direction along the wall part are protruded from the wall part in the direction along the wall part. According to this structure, a width of the coil held by the wall part can be increased in a direction along the wall part.

In at least an embodiment of the present invention, the connecting part is provided with a meandering part disposed on an inner side with respect to the wall part and a straight part connecting the meandering part with the supporting point part, and the straight part is disposed in the space part. According to this structure, the straight part can be disposed at a corner part of the holder by utilizing the space part. Therefore, the widths of the wall part and the coil or the magnet held by the wall part can be increased. In this case, it may be structured that the supporting point part is a portion extending in a circumferential direction whose inner side face is fixed with a spherical body made of metal, the straight parts connecting the meandering part with the supporting point part on both sides in the circumferential direction of the supporting point part are extended to an inner side of the space part, and the straight part is connected with the meandering part on the inner side of the space part.

In at least an embodiment of the present invention, the optical module includes an upper module in a rectangular parallelepiped outward shape in which a lens is incorporated, each of side faces of the upper module in the rectangular parallelepiped outward shape is provided so as to face the wall part provided along each of the sides of the rectangular holder, and a meandering part of the connecting part disposed on an inner side of the wall part is disposed between the side face of the upper module and the wall part. According to this structure, the meandering part is disposed by utilizing a space between the side face of the upper module and the wall part and thus the size of the entire device can be reduced. In this case, it may be structured that the meandering part is formed so that a curved line part folded back so as to come close to and separate from the wall part is formed along each of the wall parts between the side faces of the upper module and the wall parts.

In at least an embodiment of the present invention, the holder is provided with a rectangular frame part formed with a rectangular holding hole on which the optical module in a rectangular shape is disposed, the rectangular frame part is provided with the wall parts stood up from respective side edges of the rectangular frame part, and the wall part includes a reinforcing member which is provided from the rectangular frame part into the wall part so as to prevent inclination of the wall part. According to this structure, inclination of the wall part is capable of being prevented by the reinforcing member. In this case, when tip ends of the wall parts stood up from the respective side edges of the rectangular frame part are connected with each other by a connecting plate whose center is formed with a circular opening, inclinations of the wall parts stood up from respective side edges of the frame part can be prevented by the connecting plate.

In at least an embodiment of the present invention, the holder is made of resin, the reinforcing member is a metal plate, the connecting plate is a metal plate, the connecting plate is used as a weight configured to adjust a gravity center position of the movable body in an optical axis direction of the optical module, and a tip end of the reinforcing member on an opposite side in the optical axis direction to the rectangular frame part is protruded from the wall part and the tip end of the reinforcing member is joined to the weight which is the connecting plate. According to this structure, inclinations of the wall parts stood up from the respective side edges of the frame part can be prevented by the connecting plate, and a gravity center position in the optical axis direction of the movable body can be also adjusted by the connecting plate or the weight.

In at least an embodiment of the present invention, the shake correction drive mechanism includes coils and magnets, one of the coil and the magnet is held by an outer side face of the wall part, and the supporting point part is located on an outer side relative to the one of the coil and the magnet. According to this structure, one of the coil and the magnet can be disposed on an inner side and thus the size of the entire device can be reduced.

In at least an embodiment of the present invention, the other of the coil and the magnet is held by an inner side face of the body part, and a part of the other of the coil and the magnet is located on an inner side relative to the supporting point part in a direction intersecting an optical axis direction of the optical module. According to this structure, in addition to one of the coil and the magnet, the other can be disposed on an inner side relative to the supporting point part. Therefore, the size of the entire device can be reduced.

In at least an embodiment of the present invention, the swing support part includes a contact spring and a contact spring holding part, and the contact spring holding part is provided with a contact spring wall part which supports the contact spring in a direction intersecting an optical axis direction of the optical module. According to this structure, the contact spring can be held surely. Further, the contact spring holding part can be disposed on an outer peripheral side with respect to the wall part and thus, even when the size of the device is reduced, a space for providing the contact spring holding part can be secured.

In at least an embodiment of the present invention, the contact spring holding part includes a restriction part configured to restrict movement of the movable frame to the optical axis direction. According to this structure, the movable frame can be avoided from disengaging from the swing support part due to movement in the optical axis direction.

Other features and advantages of the invention will be apparent from the following detailed description, taken in conjunction with the accompanying drawings that illustrate, by way of example, various features of embodiments of the invention.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION OF EMBODIMENTS

An embodiment of an optical unit with a shake correction function to which at least an embodiment of the present invention is applied will be described below with reference to the accompanying drawings. In this specification, three axes "X", "Y" and "Z" are directions perpendicular to each other. "+X" is indicated on one side of the "X"-axis direction, "−X" is indicated on the other side, "+Y" is indicated on one side of the "Y"-axis direction, "−Y" is indicated on the other side, "+Z" is indicated on one side of the "Z"-axis direction, and "−Z" is indicated on the other side. The "Z"-axis direction is a direction along an optical axis "L" of an optical module (optical axis of a lens) included in the optical unit. Further, the "−Z" direction is an image side in the optical axis "L" direction and the "+Z" direction is an object side in the optical axis "L" direction.

(Entire Structure)

Figure 1A:
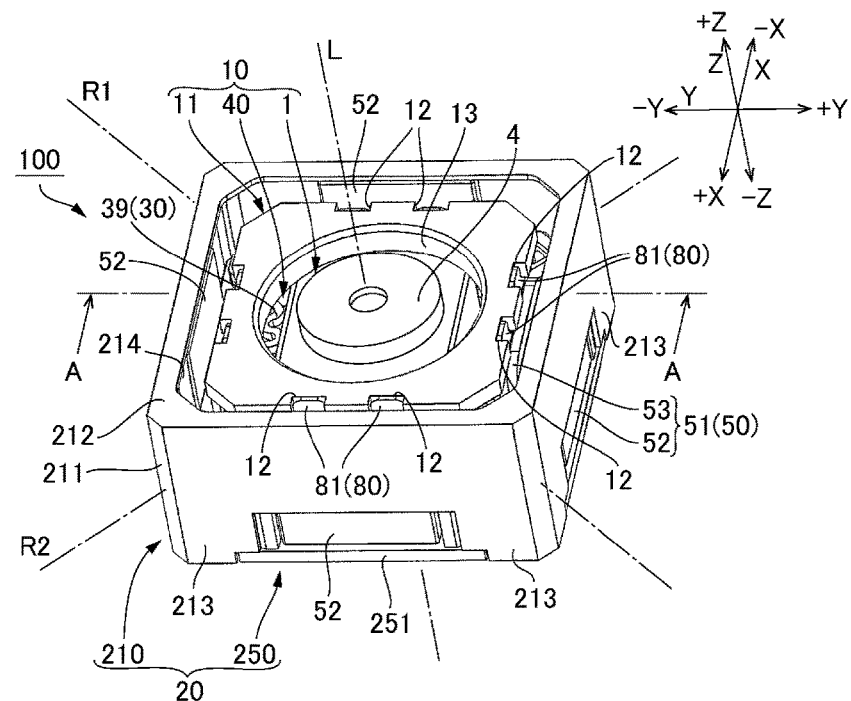
FIGS. 1A and 1B are perspective views showing an optical unit with a shake correction function in accordance with at least an embodiment of the present invention.
Figure 1B:
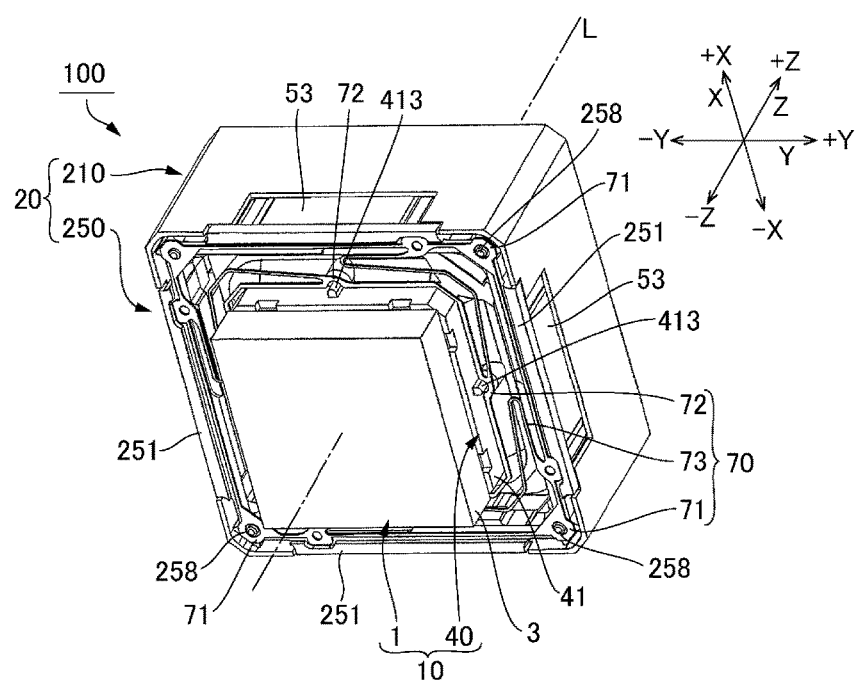
Figure 2:
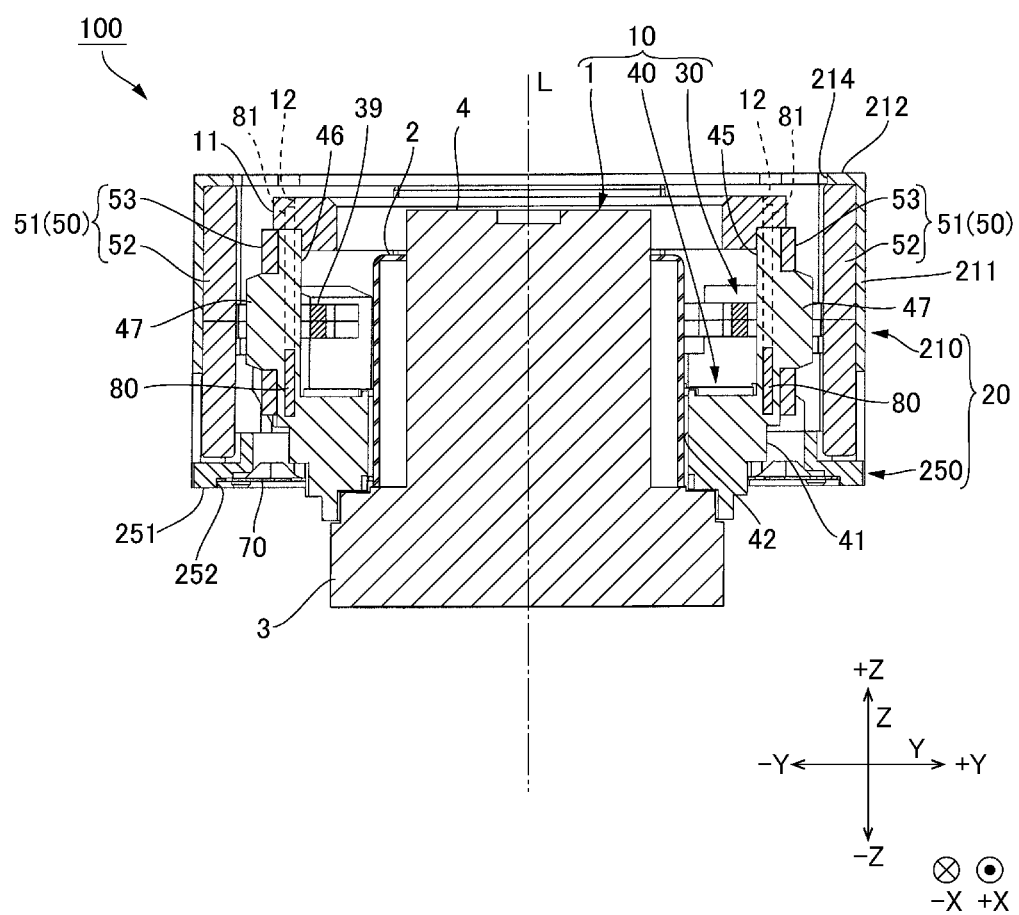
FIG. 2 is a cross-sectional view showing the optical unit in FIG. 1A.
Figure 3:
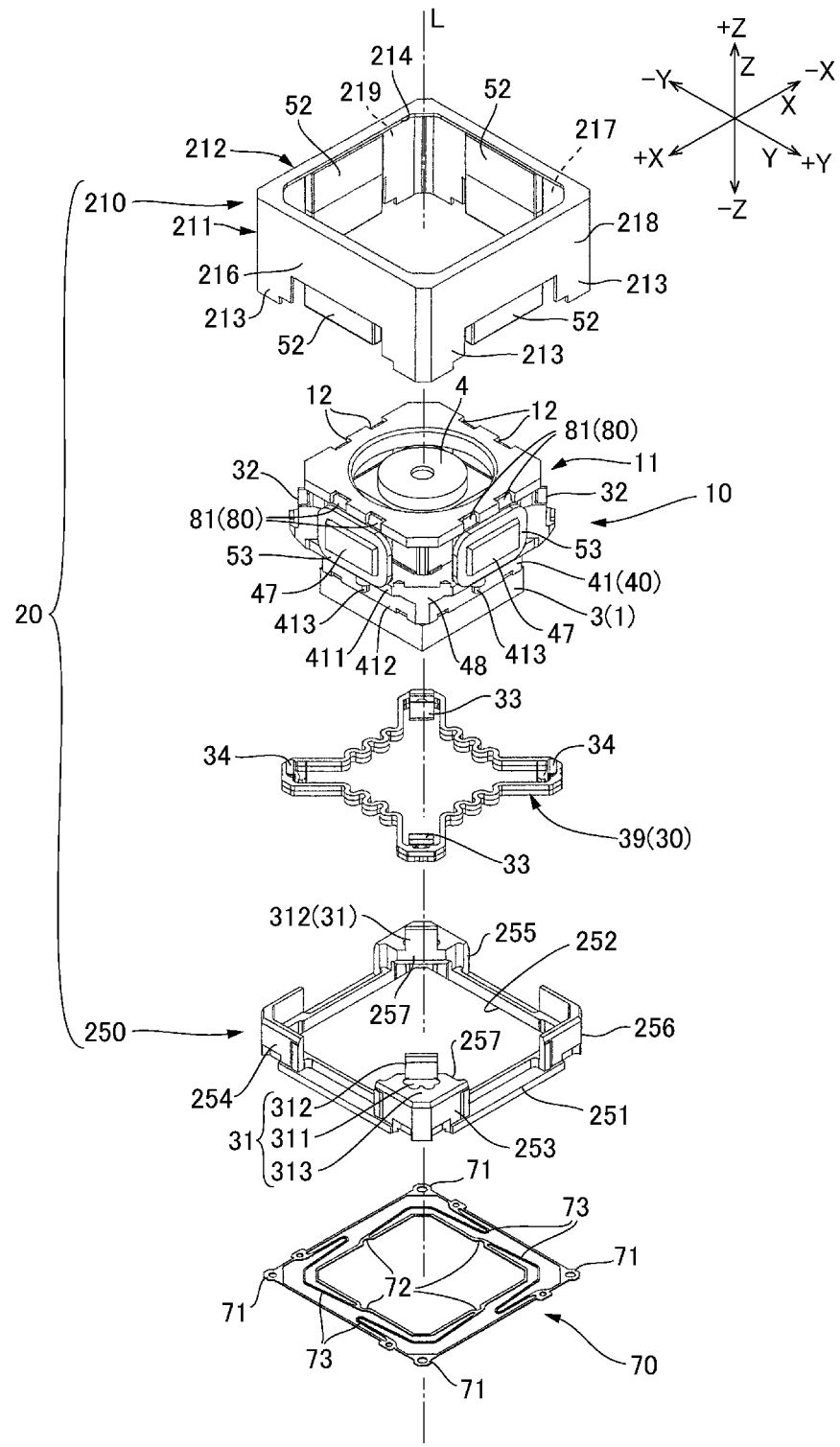
FIG. 3 is an exploded perspective view showing the optical unit in FIGS. 1A and 1B.

FIGS. 1A and 1B are perspective views showing an optical unit 100 with a shake correction function (hereinafter, referred to as an optical unit 100) to which at least an embodiment of the present invention is applied. FIG. 1A is a perspective view showing an optical unit 100 which is viewed from an object side ("+Z" direction side) and FIG. 1B is a perspective view showing the optical unit 100 viewed from an image side ("−Z" direction side). FIG. 2 is a cross-sectional view showing the optical unit 100 ("A-A" cross-sectional view in FIG. 1A). FIG. 3 is an exploded perspective view showing the optical unit 100. The optical unit 100 is mounted on an optical device such as a cell phone with a camera. When a shake such as a hand shake is occurred in the optical device at a time of photographing, disturbance is generated in a photographed image. Turning around the "X"-axis of the optical unit 100 corresponds to a so-called pitching (vertical swing), turning around the "Y"-axis corresponds to a so-called yawing (lateral swing), and turning around the "Z"-axis corresponds to a so-called rolling.

As shown in FIGS. 2 and 3, the optical unit 100 includes a movable body 10, a fixed body 20, a support mechanism 30 which swingably supports the movable body 10 with respect to the fixed body 20, a shake correction drive mechanism 50 structured to generate magnetic-drive force for relatively displacing the movable body 10 with respect to the fixed body 20, and a plate-shaped spring 70 which connects the movable body 10 with the fixed body 20. The optical unit 100 is electrically connected with a host control section provided in a main body of an optical device on which the optical unit 100 is mounted through a flexible circuit board not shown. Further, the optical unit 100 is mounted with a gyroscope (shake detection sensor) not shown. When a shake such as a hand shake is occurred in the optical device, the shake of hand is detected and the shake correction drive mechanism 50 is driven and thereby the movable body 10 is swung to perform shake correction.

The movable body 10 is, with respect to the fixed body 20, swingably supported around a first axial line "R1" (see FIG. 1A) intersecting the optical axis "L" and is swingably supported around a second axial line "R2" (see FIG. 1A) intersecting the optical axis "L" and the first axial line "R1". In this embodiment, the first axial line "R1" and the second axial line "R2" are perpendicular to the optical axis "L". Further, the first axial line "R1" and the second axial line "R2" are perpendicular to each other.

(Fixed Body)

The fixed body 20 includes a first case 210 and a second case 250 whose outward forms viewed in the "Z"-axis direction are square shapes. The first case 210 is assembled to the second case 250 from the "+Z" direction side and is fixed to the second case 250 by welding or the like. The first case 210 is provided with a body part 211 in a rectangular tube shape which surrounds the movable body 10, and an end plate part 212 in a rectangular frame shape which is protruded to an inner side from an end part in the "+Z" direction of the body part 211. The end plate part 212 is formed with a rectangular window 214. The body part 211 is provided with a side plate part 216 located on the "+X" direction side, a side plate part 217 located on the "−X" direction side, a side plate part 218 located on the "+Y" direction side, and a side plate part 219 located on the "−Y" direction side. A protruded part 213 protruding to the "−Z" direction is formed at corner parts where adjacent side plate parts are connected with each other.

The second case 250 is provided with a bottom plate part 251 in a rectangular frame shape in which an opening part 252 is formed, and side wall parts 253, 254, 255 and 256 which are stood up to the "+Z" direction from four corners of the bottom plate part 251. When the first case 210 is assembled to the second case 250, the protruded parts 213 of the first case 210 cover the side wall parts 253, 254, 255 and 256. As shown in FIG. 3, the side wall parts 253 and 255 formed at diagonal positions on the first axial line "R1" are provided with projecting parts 257 respectively projecting to inner sides. The projecting part 257 is formed with a first contact spring holding part 31 which structures a first swing support part 36 of the support mechanism 30. The first contact spring holding part 31 is provided with a recessed part 311 formed in the projecting part 257, a contact spring wall part 312 which is protruded in the "+Z" direction on an inner side of the recessed part 311, and a restriction part 313 located to an outer side of the recessed part 311. The restriction part 313 is a portion located to an outer side of the recessed part 311 in the projecting part 257.

(Shake Correction Drive Mechanism)

The shake correction drive mechanism 50 includes four magnetic drive mechanisms 51 provided between the fixed body 20 and the movable body 10. Each of the magnetic drive mechanisms 51 includes a magnet 52 and a coil 53. The coil 53 is an air-core coil. The coil 53 is held by side faces on the "+X" direction side and the "−X" direction side of the movable body 10, and is held by side faces on the "+Y" direction side and the "−Y" direction side of the movable body 10. The magnet 52 is, in the body part 211 of the first case 210, held by an inner face of the side plate part 216 located on the "+X" direction side, an inner face of the side plate part 217 located on the "−X" direction side, an inner face of the side plate part 218 located on the "+Y" direction side, and an inner face of the side plate part 219 located on the "−Y" direction side. Therefore, the magnet 52 and the coil 53 face each other on each of "+X" direction side, "−X" direction side, "+Y" direction side, and "−Y" direction side between the movable body 10 and the body part 211 of the first case 210.

The magnet 52 is magnetized so that a pole on an outer face side contacted with the body part 211 and a pole on an inner face side facing the coil 53 are different from each other. Further, the magnet 52 is divided into two pieces in the optical axis "L" direction (in other words, "Z"-axis direction) and is magnetized so that magnetic poles on the inner face side are different from each other with the divided position as a boundary. Therefore, long side portions on an upper side and a lower side of the coil 53 are utilized as effective sides. Magnetized patterns on outer face sides and inner face sides of four magnets are the same as each other. The first case 210 is structured of magnetic material and functions as a yoke for the magnets 52.

(Movable Body)

Figure 4:
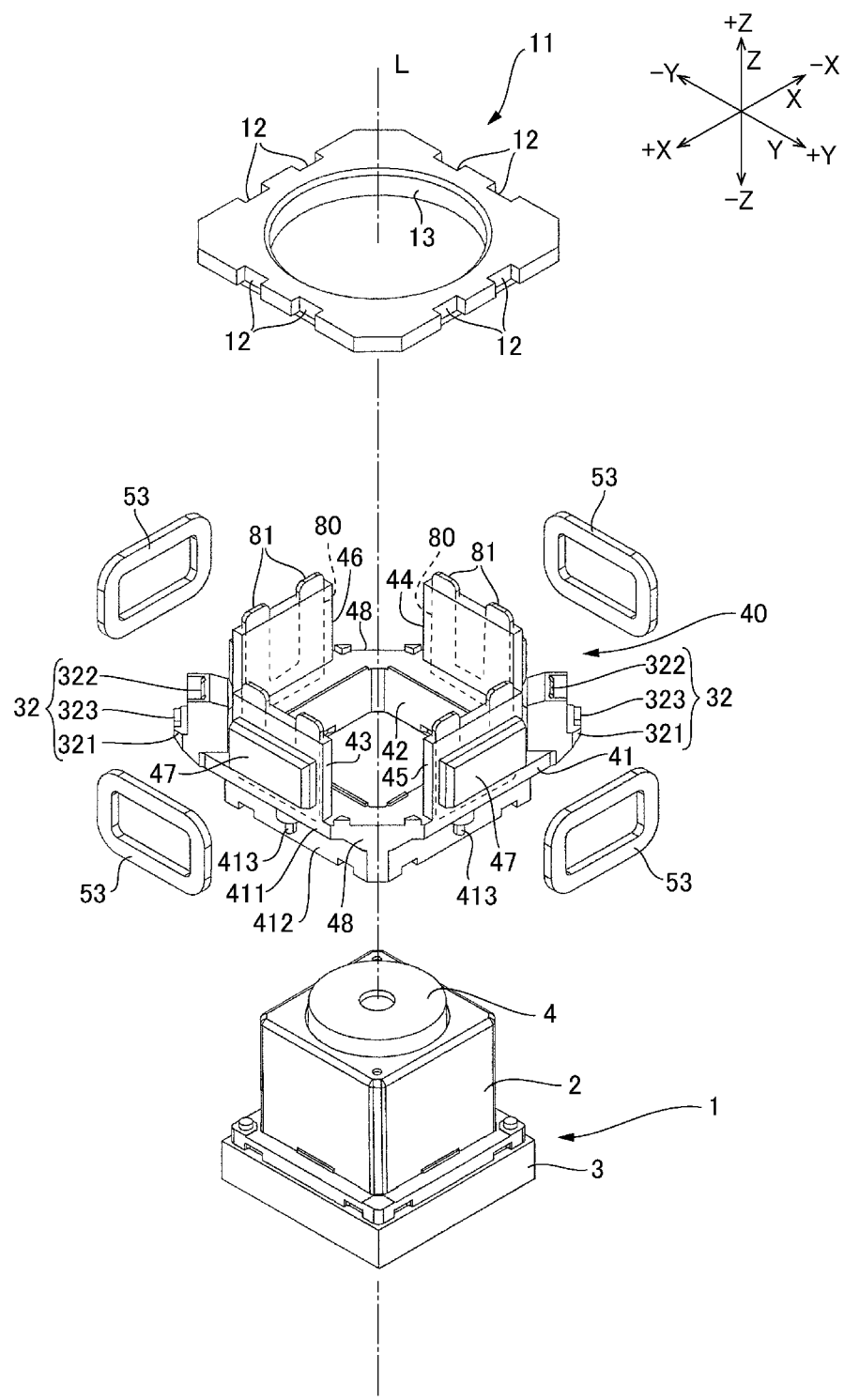
FIG. 4 is an exploded perspective view showing a movable body.
Figure 5:
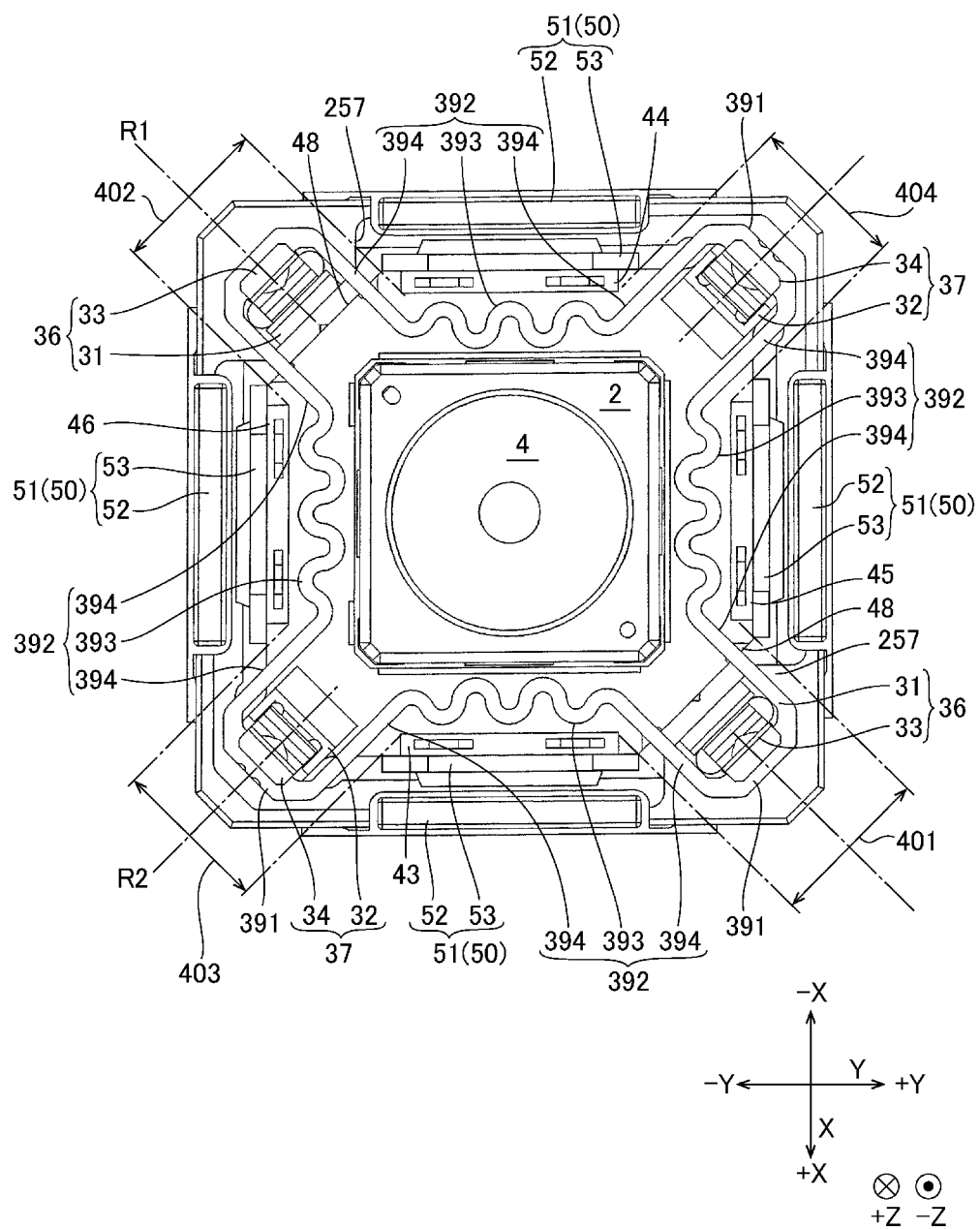
FIG. 5 is a plan view showing the optical unit from which a first case and a weight are detached.

FIG. 4 is an exploded perspective view showing the movable body 10 and FIG. 5 is a plan view showing the optical unit 100 from which the first case 210 and a weight 11 are detached. The movable body 10 includes an optical module 1, a holder 40 which holds the optical module 1, and a weight 11 fixed on the "+Z" direction side of the holder 40. The optical module 1 is disposed so that its optical axis "L" is directed in the "Z"-axis direction. The weight 11 is used as a connecting plate for connecting end parts on an object side ("+Z" direction side) of wall parts 43, 44, 45 and 46 (opposite side to a frame part 41 in the optical axis direction) which are stood up from the frame part 41 of the holder 40 described below and, in addition, the weight 11 adjusts a gravity center position in the "Z"-axis direction of the movable body 10. The weight 11 is a rectangular metal plate and a circular opening 13 is formed in its center portion. An outer circumferential edge of the weight 11 is formed with two recessed parts 12 on each side. Protruded parts 81 of a reinforcing member 80 described below and the recessed parts 12 of the weight 11 are engaged and fixed to each other and thereby the wall parts 43, 44, 45 and 46 stood up from the frame part 41 are held each other through the weight 11 and inclination of the wall parts 43, 44, 45 and 46 can be prevented. The weight 11 is made of nonmagnetic metal and thus magnetic attraction force is not generated between the weight 11 and the magnets 52.

The optical module 1 includes an upper module 2 in which a lens as an optical element, an imaging element and the like are incorporated, and a lower module 3 in which a gyroscope and electronic components such as a wiring circuit board are incorporated. An outward form of the upper module 2 is a rectangular parallelepiped shape. A lens holder 4 in a cylindrical shape is protruded from a face in the "+Z" direction of the upper module 2. The lower module 3 is formed in a rectangular parallelepiped shape larger than the upper module 2. The lower module 3 is located on the "−Z" direction side of the upper module 2 and is protruded from the upper module 2 to outer sides of "+X" direction side, "−X" direction side, "+Y" direction side and "−Y" direction side by the same dimension as each other. When the optical module 1 is viewed in the "Z"-axis direction, the lens holder 4 is in a circular shape with the optical axis "L" as a center, but the outward forms of the upper module 2 and the lower module 3 are square shapes.

The holder 40 structures an outer peripheral portion of the movable body 10. The holder 40 is provided with a frame part 41 whose planar shape is a substantially rectangular shape, specifically, a substantially square shape when viewed in the "Z"-axis direction. The frame part 41 is formed with a rectangular holding hole 42 on which the upper module 2 of the optical module 1 is disposed. The holder 40 is provided with the wall parts 43, 44, 45 and 46 which are stood up in the "+Z" direction from respective side edges on "+X" direction side, "−X" direction side, "+Y" direction side, and "−Y" direction side of the frame part 41. The wall parts 43, 44, 45 and 46 are disposed so as to surround an outer peripheral side of the holding hole 42, and are extended in straight shapes in the "X"-axis direction or the "Y"-axis direction in center portions of respective side edges of the frame part 41. An arrangement space in which a movable frame 39 of a support mechanism 30 described below is capable of being disposed is formed and secured between an outer peripheral face of the upper module 2 disposed in the holding hole 42 and the wall parts 43, 44, 45 and 46.

Each of the wall parts 43, 44, 45 and 46 is provided with a coil holding part 47 formed on its outer side face which faces an opposite side to the holding hole 42. The coil holding part 47 is a rectangular protruded part which is protruded from each of outer side faces of the wall parts 43, 44, 45 and 46. A coil 53 of the magnetic drive mechanism 51 is disposed on an outer peripheral side of the coil holding part 47. The coils 53 are fixed to outer side faces of the wall parts 43, 44, 45 and 46 by an adhesive or the like in a state that the coil holding parts 47 are fitted to their centers. In a state that the coils 53 are fixed to the wall parts 43, 44, 45 and 46, as shown in FIG. 5, both outer side end faces of the coil 53 are protruded from both side end faces of the wall parts 43, 44, 45 and 46 when viewed in the optical axis direction "L", and a width of the coil 53 in a direction along each of the wall parts 43, 44, 45 and 46 is set larger than a width of each of the wall parts 43, 44, 45 and 46. However, supporting point parts 391 described below of the movable frame 39 provided at four positions around the optical axis "L" are provided at four corners of the body part 211 of the first case 210. Therefore, even when the width of the coil 53 is increased relative to the widths of the wall parts 43, 44, 45 and 46, a width of a space between the wall parts adjacent to each other in a circumferential direction (space parts 401, 402, 403 and 404) and a width of a space between adjacent coils 53 in the circumferential direction can be secured in the substantially same amount. The coil 53 may be formed by directly winding a wire around the coil holding part 47 or a coil previously formed in an air-core coil shape may be attached to the coil holding part 47. As shown in FIG. 2, the coil holding part 47 is protruded to a side of the magnet 52 from the center of the coil 53 and faces the magnet 52. When the movable body 10 is displaced in the "X"-axis direction or the "Y"-axis direction due to a shake or the like, the coil holding part 47 is abutted with the magnet 52 to restrict a moving range of the movable body 10.

The frame part 41 is provided with cut-out parts 48 formed in diagonal positions on the first axial line "R1". The cut-out parts 48 are portions formed by cutting two corner parts located at diagonal positions on the first axial line "R1" in a direction perpendicular to the first axial line "R1". As shown in FIG. 5, the cut-out part 48 is disposed in a space part 401 provided between the wall part 43 on the "+X" direction side and the wall part 45 on the "+Y" direction side and in a space part 402 provided between the wall part 44 on the "−X" direction side and the wall part 46 on the "−Y" direction side. When the movable body 10 is assembled to the fixed body 20, the projecting parts 257 provided at diagonal positions on the first axial line "R1" of the second case 250 face the cut-out parts 48. The first contact spring holding part 31 provided in the projecting part 257 is disposed in the space part 401 between the wall part 43 and the wall part 45 and in a space part 402 between the wall part 44 and the wall part 46 at the diagonal positions on the first axial line "R1" of the frame part 41.

A second contact spring holding part 32 structuring the second swing support part 37 of the support mechanism 30 is formed at diagonal positions on the second axial line "R2" of the frame part 41. The second contact spring holding part 32 is disposed in a space part 403 provided between the wall part 43 on the "+X" direction side and the wall part 46 on the "−Y" direction side and in a space part 404 provided between the wall part 44 on the "−X" direction side and the wall part 45 on the "+Y" direction side. As shown in FIG. 4, the second contact spring holding part 32 is provided with a contact spring wall part 322 stood up to the "+Z" direction, a protruded part 321 protruded to an outer side from a root part of the contact spring wall part 322, and a restriction part 323 protruded from a tip end part of the protruded part 321 to the "+Z" direction.

An outer peripheral face of the frame part 41 is formed so that each face of the "+X" direction side, the "−X" direction side, the "+Y" direction side, and the "−Y" direction side is formed with a step shape at a midway position in the "Z"-axis direction. In other words, as shown in FIGS. 3 and 4, a portion on the "+Z" direction side of an outer peripheral face of the frame part 41 forms a projecting part 411 which is projected to an outer peripheral side. On the other hand, a portion on the "−Z" direction side of the outer peripheral face of the frame part 41 forms a step part 412 which is recessed to an inner peripheral side. The step part 412 is formed with a fixing protruded part 413 which is protruded to an outer side at a center of each of the faces directed to the "+X" direction side, the "−X" direction side, the "+Y" direction side, and the "−Y" direction side. The fixing protruded part 413 functions as an engaging part which is engaged with a plate-shaped spring 70 as described below.

The holder 40 is made of resin and includes reinforcing members 80 (see FIGS. 2 and 4) integrated with its resin portion by insert molding. The reinforcing member 80 in this embodiment is a "U"-shaped metal plate, and one reinforcing member 80 is disposed and buried in each of the wall parts 43, 44, 45 and 46. The reinforcing member 80 is extended to a lower side ("−Z" direction side) relative to lower ends of the wall parts 43, 44, 45 and 46 which are stood up to the "+Z" direction from respective side edges of the frame part 41, in other words, extended to an inside of the frame part 41 (see FIG. 2). Therefore, the reinforcing member 80 functions to reinforce the wall parts 43, 44, 45 and 46 so as not to incline from their lower ends and thus impact resistance of the holder 40 is increased. Further, the reinforcing member 80 is provided with two protruded parts 81 protruding to the "+Z" direction at two positions from end faces in the "+Z" direction of the wall parts 43, 44, 45 and 46. An end face on an outer peripheral side of the weight 11 is formed with a recessed part 12 at positions corresponding to the protruded parts 81. When the weight 11 is fixed to the holder 40, the protruded part 81 is disposed at the recessed part 12 and the weight 11 is positioned. Further, both of the reinforcing member 80 and the weight 11 are made of metal and thus the weight 11 can be fixed to the holder 40 by metal joining of the protruded parts 81 to the recessed part 12. When the weight 11 is fixed to the wall parts 43, 44, 45 and 46, the wall parts 43, 44, 45 and 46 which are stood up to the "+Z" direction in a cantilevered manner from each side edge of the frame part 41 are connected with each other through the weight 11 and thus the wall parts 43, 44, 45 and 46 are structured so as to be supported each other and inclinations of the wall parts 43, 44, 45 and 46 can be prevented. Therefore, the weight 11 also acts as a connecting plate for the wall parts 43, 44, 45 and 46 and thus, in accordance with an embodiment of the present invention, this plate corresponding to the weight 11 is used only as a simple connecting plate, and a function as the weight 11 may be structured in another structural member.

In accordance with an embodiment of the present invention, a rectangular frame-shaped metal member connecting the lower ends of the reinforcing members 80 inserted into the wall parts 43, 44, 45 and 46 with each other may be provided in the frame part 41 by insert molding. In this case, one piece reinforcing member having "U"-shaped metal plates stood up from respective sides of the rectangular frame-shaped metal member is insert-molded in a resin portion to structure the holder 40.

The holder 40 holds, as shown in FIG. 2, the optical module 1 in a state that an upper module 2 is disposed on the holding hole 42 and a lower end part of the frame part 41 and an upper end part of a lower module 3 are abutted with each other in the "Z"-axis direction. When the movable body 10 is assembled to the fixed body 20, as shown in FIGS. 1B and 2, a lower side portion of the frame part 41 and the lower module 3 are protruded from an opening part 252 of the second case 250 to the "−Z" direction side in a lower end portion of the optical unit 100.

(Plate-Shaped Spring)

A plate-shaped spring 70 is a member which connects the fixed body 20 with the movable body 10 and determines a posture of the movable body 10 when the shake correction drive mechanism 50 is set in a stopped state. The plate-shaped spring 70 is a rectangular frame-shaped spring member which is formed by processing a metal plate. The plate-shaped spring 70 is provided with fixed body side connection parts 71 connected with the fixed body 20, movable body side connection parts 72 connected with the movable body 10, and arm parts 73 which connect the fixed body side connection parts 71 with movable body side connection parts 72. As shown in FIG. 1B, a fixing protruded part 258 protruding to the "−Z" direction is formed at four corners of the bottom plate part 251 when the second case 250 is viewed from the "−Z" direction side. The fixed body side connection parts 71 are formed on an outer peripheral part of the plate-shaped spring 70 and are formed with holes to which the fixing protruded parts 258 are fitted. On the other hand, the movable body side connection parts 72 are formed on an inner peripheral edge of the plate-shaped spring 70. The movable body side connection parts 72 are recessed parts formed at positions corresponding to the fixing protruded parts 413 formed on an outer peripheral face of the holder 40.

The plate-shaped spring 70 is overlapped with the bottom plate part 251 of the second case 250 from the "−Z" direction side, and is attached so as to surround a portion of the movable body 10 (frame part 41 of the holder 40) protruded from the opening part 252 of the second case 250. The fixed body side connection parts 71 of the plate-shaped spring 70 are fixed to the fixing protruded parts 258 formed on the fixed body 20 (second case 250), and the movable body side connection parts 72 of the plate-shaped spring 70 are engaged with the fixing protruded parts 413 formed on the movable body 10 (holder 40). In this manner, the fixed body 20 and the movable body 10 are connected with each other through the plate-shaped spring 70.

(Support Mechanism)

Figure 6:
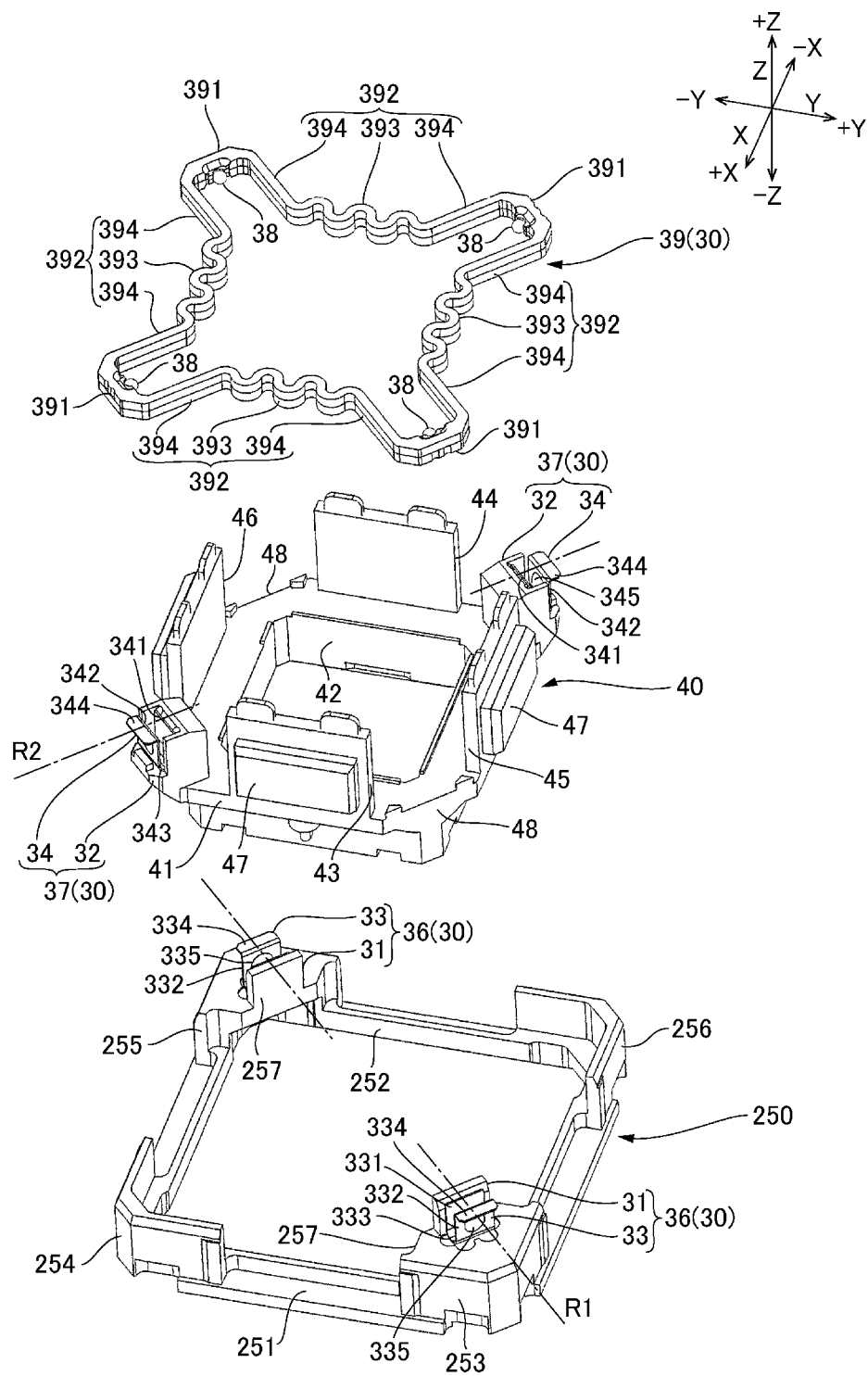
FIG. 6 is an exploded perspective view showing a support mechanism.
Figure 7A:
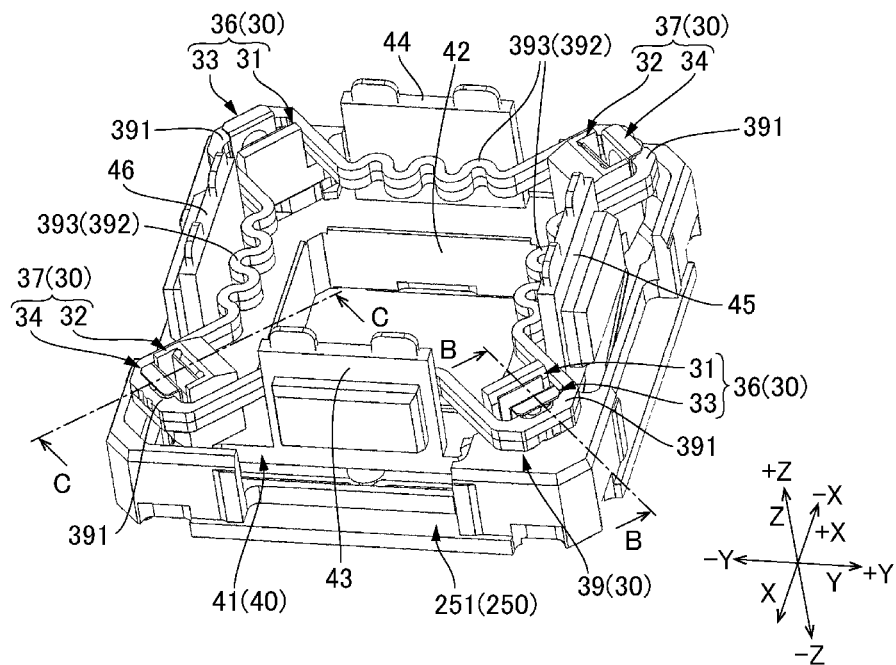
FIGS. 7A, 7B and 7C are explanatory views showing the support mechanism.
Figure 7B:
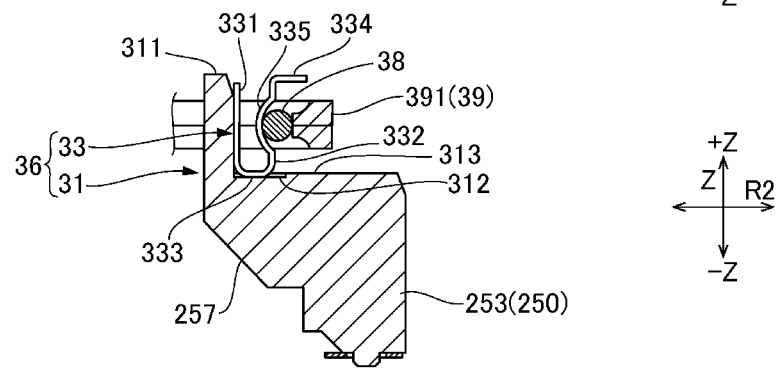
Figure 7C:
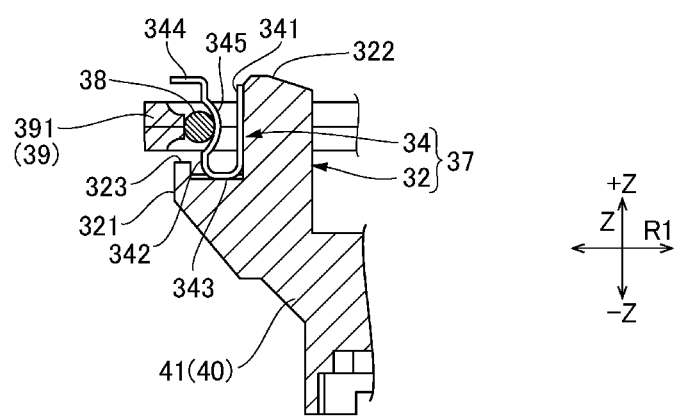

FIG. 6 is an exploded perspective view showing a support mechanism 30. FIGS. 7A, 7B and 7C are explanatory views showing the support mechanism 30. FIG. 7A is a perspective view showing an assembled state of the support mechanism 30, FIG. 7B is a cross-sectional view showing the first swing support part (partial cross-sectional view cut at the "B-B" position in FIG. 7A), and FIG. 7C is a cross-sectional view showing the second swing support part (partial cross-sectional view cut at the "C-C" position in FIG. 7A). As described above, in the optical unit 100 in this embodiment, in order to swingably support the movable body 10 around the first axial line "R1" and the second axial line "R2", a support mechanism 30 described below is structured between the second case 250 of the fixed body 20 and the holder 40 of the movable body 10. In this embodiment, a gimbal mechanism is used as the support mechanism 30. The support mechanism 30 (gimbal mechanism) includes two first swing support parts 36 provided at two positions separated in the first axial line "R1" direction, two second swing support parts 37 provided at two positions separated from each other in the second axial line "R2" direction, and a movable frame 39 supported by the two first swing support parts 36 and the two second swing support parts 37.

The movable frame 39 is a gimbal spring which is a plate spring formed in a schematically rectangular shape. The movable frame 39 is provided with supporting point parts 391, which swingably support the movable body 10 provided at four positions around the optical axis "L", and connecting parts 392 which connect the supporting point parts 391 adjacent to each other around the optical axis "L". Two supporting point parts 391 are provided at diagonal positions on the first axial line "R1", and two remained supporting point parts 391 are provided at diagonal positions on the second axial line "R2". The connecting parts 392 are provided with meandering parts 393 extended in the "X"-axis direction or the "Y"-axis direction and straight parts 394 respectively extended to the supporting point parts 391 from both ends of the meandering parts 393. The meandering part 393 is extended in the "X"-axis direction or the "Y"-axis direction while meandering in a plane perpendicular to the "Z"-axis direction (in other words, the optical axis "L" direction). Specifically, the meandering part 393 is formed so that a curved line part meandered (folded back) so as to come close to and separate from each of the wall parts 43, 44, 45 and 46 is formed along each wall part on an inner side of each of the wall parts 43, 44, 45 and 46 and on an outer side with respect to the side face of the upper module 2 of the optical module 1. The curved line part is also meandered (folded back) so as to come close to and separate from the side face of the upper module 2. In other words, the meandering part 393 is formed so that a curved line part is curved and folded back between the wall parts 43, 44, 45 and 46 and the side face of the upper module 2 disposed parallel to each other. In at least non-operating state of the optical unit 100, the meandering parts 393 are separated from the wall parts 43, 44, 45 and 46 and the side face of the upper module 2 and are not contacted with the wall parts 43, 44, 45 and 46 and the side face of the upper module 2. Therefore, the meandering part 393 is capable of being elastically deformed in a direction perpendicular to the optical axis "L".

Each of the supporting point parts 391 is extended in a circumferential direction. A metal spherical body 38 is fixed to an inner side face of each of the supporting point parts 391 by welding or the like. A hemispheric convex face directing to the center of the movable frame 39 is provided at each of the supporting point parts 391 by the spherical body 38. The straight parts 394 are extended in parallel to each other toward an inner side from both ends in the circumferential direction of each of the supporting point parts 391. Therefore, the supporting point part 391 is an extended portion to which the spherical body 38 is fixed and which is extended in the circumferential direction and, is a connecting portion of the two parallel straight parts 394 with each other. The straight parts 394 are extended to inner sides relative to the wall parts 43, 44, 45 and 46 and connected with the meandering parts 393 on the inner sides relative to the wall parts 43, 44, 45 and 46.

The first swing support part 36 includes a first contact spring holding part 31 provided in the second case 250 of the fixed body 20 and a first contact spring 33 held by the first contact spring holding part 31. The first contact spring 33 is a plate spring made of metal which is bent in a "U"-shape. The first contact spring 33 is provided with a fixed side plate spring part 331 and a movable side plate spring part 332 which are extended in the "Z"-axis direction, a turned-back part 333 extended in a direction intersecting the "Z"-axis direction to connect the fixed side plate spring part 331 with the movable side plate spring part 332, and a bent part 334 which is protruded to an opposite side to the fixed side plate spring part 331 (in other words, an outer side) from an end part in the "+Z" direction of the movable side plate spring part 332. The first contact spring 33 is disposed so that the fixed side plate spring part 331 is abutted with the contact spring wall part 312 of the first contact spring holding part 31 in a direction perpendicular to the optical axis "L" direction (first axial line "R1" direction), and that the turned-back part 333 is abutted with the bottom face of the recessed part 311 in the optical axis "L" direction. Therefore, the first contact spring 33 is supported by the contact spring wall part 312 in a direction perpendicular to the optical axis "L" direction (first axial line "R1" direction) and is supported by the bottom face of the recessed part 311 on an image side ("−Z" direction) in the optical axis "L" direction.

The second swing support part 37 includes a second contact spring holding part 32 provided in the holder 40 of the movable body 10 and a second contact spring 34 held by the second contact spring holding part 32. The second contact spring 34 is a plate spring made of metal which is bent in a "U"-shape and has the same shape as the first contact spring 33. In other words, the second contact spring 34 is provided with a fixed side plate spring part 341 and a movable side plate spring part 342 which are extended in the "Z"-axis direction, a turned-back part 343 extended in a direction intersecting the "Z"-axis direction to connect the fixed side plate spring part 341 with the movable side plate spring part 342, and a bent part 344 which is protruded to an opposite side to the fixed side plate spring part 341 (in other words, an outer side) from an end part in the "+Z" direction of the movable side plate spring part 342. The second contact spring 34 is disposed so that the fixed side plate spring part 341 is abutted with the contact spring wall part 322 of the second contact spring holding part 32 in a direction perpendicular to the optical axis "L" direction (second axial line "R2" direction), and that the turned-back part 343 is abutted with the protruded part 321 on an image side ("−Z" direction) in the optical axis "L" direction. Therefore, the second contact spring 34 is supported by the contact spring wall part 322 in a direction perpendicular to the optical axis "L" direction (second axial line "R2" direction) and is supported by the protruded part 321 on an image side ("−Z" direction) in the optical axis "L" direction.

The movable frame 39 is supported by four swing support parts, in other words, two first swing support parts 36 which are disposed on inner sides of the supporting point parts 391 provided at diagonal positions of the first axial line "R1" direction, and two second swing support parts 37 disposed on inner sides of the supporting point parts 391 provided at diagonal positions of the second axial line "R2" direction. The movable side plate spring part 332 of the first contact spring 33 and the movable side plate spring part 342 of the second contact spring 34 are respectively formed with contact point parts 335 and 345 in a hemispheric recessed shape which are contacted with the spherical bodies 38 welded to the supporting point parts 391. The first swing support parts 36 and the second swing support parts 37 support the movable frame 39 through the first contact springs 33 attached in an elastically deformable state in the first axial line "R1" direction and through the second contact springs 34 attached in an elastically deformable state in the second axial line "R2" direction. The first contact springs 33 and the second contact springs 34 are contacted with the spherical bodies 38 of the movable frame 39 through the contact point parts 335 and 345 in a hemispheric recessed shape. Therefore, the movable frame 39 is supported in a turnable state around each of the two directions perpendicular to the optical axis "L" direction (the first axial line "R1" direction and the second axial line "R2" direction).

Movement to an object side ("+Z" direction side) in the optical axis "L" direction of the movable frame 39 is restricted by the bent part 334 of the first contact spring 33 and the bent part 344 of the second contact spring 34 located on the "+Z" direction side of the supporting point parts 391. Further, movement to an image side in the optical axis "L" direction ("−Z" direction side) of the movable frame 39 is restricted by the restriction part 313, which is a part located on an outer side of the recessed part 311 in the first contact spring holding part 31 and by the restriction part 323 provided in a tip end part of the protruded part 321 in the second contact spring holding part 32. In other words, the first swing support part 36 and the second swing support part 37 are structured so that the movable frame 39 is not disengaged by movement in the optical axis "L" direction.

Next, a planar structure of the support mechanism 30 when viewed in the optical axis "L" direction will be described with reference to FIG. 5. The holder 40 of the movable body 10 is provided with the wall parts 43, 44, 45 and 46 so as to surround the upper module 2 of the optical module 1. The holder 40 is formed in a square shape and the wall parts 43, 44, 45 and 46 are extended in a straight shape along respective sides of the holder 40. The arrangement spaces provided between adjacent wall parts in the circumferential direction (above-mentioned space parts 401, 402, 403 and 404) are located in corner parts of the holder 40. The first swing support parts 36 and the second swing support parts 37 supporting the movable frame 39 are disposed at positions of the arrangement spaces provided between adjacent wall parts in the circumferential direction, in other words, in the space parts 401, 402, 403 and 404. Further, the first swing support parts 36 and the second swing support parts 37 supporting the movable frame 39 are located in corner parts of the first case 210 and the second case 250 of the fixed body 20 whose outward form is a square.

The supporting point parts 391 of the movable frame 39 which are supported by the first swing support parts 36 and the second swing support parts 37 are located on an outer peripheral side relative to the wall parts 43, 44, 45 and 46. On the other hand, the meandering parts 393 of the movable frame 39 are located on inner peripheral sides relative to the wall parts 43, 44, 45 and 46, and the connecting parts 392 connecting adjacent supporting point parts 391 with each other are disposed so as to pass through the spaces between the upper module 2 of the optical module 1 and the wall parts 43, 44, 45 and 46. The straight parts 394 connecting the meandering parts 393 with the supporting point parts 391 are extended from outer side positions relative to the wall parts 43, 44, 45 and 46 to inner side positions relative to the wall parts 43, 44, 45 and 46 in parallel to the first axial line "R1" direction or the second axial line "R2" direction in the space parts 401, 402, 403 and 404. The meandering part 393 and the straight parts 394 on its both sides are connected with each other in a recessed shape to an inner peripheral side as a whole. Therefore, spaces where the wall parts 43, 44, 45 and 46 and a part of the magnetic drive mechanism 51 are capable of being disposed are secured on outer sides of the meandering parts 393 between adjacent supporting point parts 391.

The supporting point parts 391 are located on an outer peripheral side relative to the coils 53 attached to outer side faces of the wall parts 43, 44, 45 and 46. Further, the supporting point parts 391 are located on an outer peripheral side relative to the inner side faces of the magnets 52 facing the coils 53 from an outer peripheral side, but the supporting point parts 391 are located on an inner peripheral side relative to the outer side faces of the magnets 52. The entire coils 53 and the inner side portions of the magnets 52 are disposed in the spaces between the adjacent supporting point parts 391 together with the wall parts 43, 44, 45 and 46.

(Operations and Effects)

As described above, in the support mechanism 30 in this embodiment, the supporting point parts 391 of the movable frame 39 are located on an outer peripheral side relative to the wall parts 43, 44, 45 and 46 in the corner parts of the holder 40 which are formed as the spaces provided between the adjacent wall parts (space parts 401, 402, 403 and 404) in the circumferential direction. On the other hand, the connecting part 392 connecting the adjacent supporting point parts 391 with each other is formed in a recessed shape to an inner side so that the meandering parts 393 are passed through the inner sides of the wall parts 43, 44, 45 and 46. In addition, the wall parts 43, 44, 45 and 46 are disposed in the recessed spaces. According to this arrangement, spaces for disposing the supporting point parts 391 and the first swing support parts 36 and the second swing support parts 37 supporting the supporting point parts 391 are not required to secure on the inner sides of the wall parts 43, 44, 45 and 46. Therefore, the wall parts 43, 44, 45 and 46 can be disposed on an inner peripheral side and thus the thickness of the optical unit 100 can be made thinner in a direction intersecting the optical axis direction "L" and the size of the optical unit 100 can be reduced as a whole. Further, the connecting part 392 is formed in a recessed shape to an inner side and thus lowering of the support function due to shortening of the length in the circumferential direction of the movable frame 39 can be avoided.

In this embodiment, the supporting point parts 391 are located on an outer peripheral side relative the entire coils 53 and the inner side portions of the magnets 52 structuring the magnetic drive mechanism 51. Therefore, in addition to the wall parts 43, 44, 45 and 46, all of the coils 53 and the inner side portions of the magnets 52 can be disposed in the spaces surrounded by the connecting parts 392 which are recessed to an inner peripheral side between the adjacent supporting point parts 391. Accordingly, in addition to the wall parts 43, 44, 45 and 46, the shake correction drive mechanism 50 can be disposed on an inner peripheral side and thus the thickness of the optical unit 100 can be made thinner in a direction intersecting the optical axis direction "L" and the size of the optical unit 100 can be reduced as a whole.

In this embodiment, the shape of the holder 40 is rectangular and thus the arrangement spaces for disposing the first swing support parts 36 and the second swing support parts 37 supporting the supporting point parts 391 are secured by utilizing the corner parts. Therefore, while the supporting point parts 391 are located on an outer peripheral side relative to the wall parts 43, 44, 45 and 46 and the coils 53, the widths of the wall parts 43, 44, 45 and 46 and the coils 53 can be set larger. Accordingly, reduction of driving force of the shake correction drive mechanism 50 can be avoided due to reduction of its size.

In this embodiment, the first contact spring 33 and the second contact spring 34 are respectively supported by the contact spring wall part 312 and the contact spring wall part 322 in a direction perpendicular to the optical axis "L" direction and are supported by the bottom face of the recessed part 311 and the protruded part 321 on the image side ("−Z" direction) in the optical axis "L" direction. Therefore, the first contact spring 33 and the second contact spring 34 can be supported surely. Further, the first contact spring holding part 31 is provided with the restriction part 313 and the second contact spring holding part 32 is provided with the restriction part 323 and thus the movable frame 39 is prevented from being disengaged from the first swing support part 36 and the second swing support part 37 due to its movement in the optical axis "L" direction.

Modified Embodiments

In the embodiment described above, the coils 53 are held by the holder 40 and the magnets 52 are held by the body part 211 of the first case 210. However, it may be structured that the magnets 52 are held by the holder 40 and the coils 53 are held by the body part 211 of the first case 210.

While the description above refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed is:

1. An optical unit with a shake correction function comprising:
   a movable body comprising an optical module and a holder, the optical module being held by the holder;
   a fixed body comprising a body part which surrounds the movable body;
   a support mechanism structured to swingably support the movable body with respect to the fixed body; and
   a shake correction drive mechanism structured to swing the movable body;
   wherein the holder comprises a plurality of wall parts disposed on an outer peripheral side with respect to the optical module and the plurality of wall parts holds a part of the shake correction drive mechanism;
   wherein the support mechanism comprises a movable frame which surrounds the optical module and a plurality of swing support parts supporting the movable frame;
   wherein the movable frame comprises supporting point parts contacting with the swing support parts, and connecting parts connecting the supporting point parts adjacent to each other; and
   wherein the supporting point parts are located on an outer peripheral side with respect to the plurality of wall parts and the connecting parts are disposed so as to pass on inner sides with respect to the wall parts.

2. The optical unit with a shake correction function according to claim 1, wherein
   the holder is a rectangular holder,
   the wall parts are extended along respective sides of the rectangular holder,
   space parts are provided between the wall parts adjacent to each other in a circumferential direction at corner parts of the rectangular holder, and
   the swing support parts are disposed in the space parts.

3. The optical unit with a shake correction function according to claim 2, wherein
   the connecting part comprises a meandering part disposed on an inner side with respect to the wall part and a straight part connecting the meandering part with the supporting point part, and
   the straight part is disposed in the space part.

4. The optical unit with a shake correction function according to claim 2, wherein
   the optical module comprises an upper module in a rectangular parallelepiped outward shape in which a lens is incorporated,
   each of side faces of the upper module in the rectangular parallelepiped outward shape is provided so as to face the wall part provided along each of the sides of the rectangular holder, and
   a meandering part of the connecting part disposed on an inner side of the wall part is disposed between the side face of the upper module and the wall part.

5. The optical unit with a shake correction function according to claim 4, wherein the meandering part is formed so that a curved line part folded back so as to come close to and separate from the wall part is formed along each of the wall parts between the side faces of the upper module and the wall parts.

6. The optical unit with a shake correction function according to claim 4, wherein
   the supporting point part is a portion extending in a circumferential direction whose inner side face is fixed with a spherical body made of metal,
   straight parts connecting the meandering part with the supporting point part on both sides in the circumferential direction of the supporting point part are extended to an inner side of the space part, and
   the straight part is connected with the meandering part on the inner side of the space part.

7. The optical unit with a shake correction function according to claim 4, wherein
   the holder comprises a rectangular frame part formed with a rectangular holding hole on which the optical module in a rectangular shape is disposed,
   the rectangular frame part comprises the wall parts stood up from respective side edges of the rectangular frame part, and
   the wall part comprises a reinforcing member which is provided from the rectangular frame part into the wall part so as to prevent inclination of the wall part.

8. The optical unit with a shake correction function according to claim 7, wherein tip ends of the wall parts stood up from the respective side edges of the rectangular frame part are connected with each other by a connecting plate whose center is formed with a circular opening.

9. The optical unit with a shake correction function according to claim 8, wherein
   the holder is made of resin,
   the reinforcing member is a metal plate,
   the connecting plate is a metal plate,
   the connecting plate is a weight configured to adjust a gravity center position of the movable body in an optical axis direction of the optical module, and
   a tip end of the reinforcing member on an opposite side in the optical axis direction to the rectangular frame part is protruded from the wall part and the tip end of the reinforcing member is joined to the weight which is the connecting plate.

10. The optical unit with a shake correction function according to claim 1, wherein
    the shake correction drive mechanism comprises coils and magnets, one of the coil and the magnet is held by an outer side face of the wall part, and the supporting point part is located on an outer side relative to the one of the coil and the magnet.

11. The optical unit with a shake correction function according to claim 10, wherein the holder is a rectangular holder, the wall parts are extended along respective sides of the rectangular holder, space parts are provided between the wall parts adjacent to each other in a circumferential direction at corner parts of the rectangular holder, and the swing support parts are disposed in the space parts.

12. The optical unit with a shake correction function according to claim 11, wherein the connecting part comprises a meandering part disposed on an inner side with respect to the wall part and a straight part connecting the meandering part with the supporting point part, and the straight part is disposed in the space part.

13. The optical unit with a shake correction function according to claim 12, wherein the other of the coil and the magnet is held by an inner side face of the body part, and a part of the other of the coil and the magnet is located on an inner side relative to the supporting point part in a direction intersecting an optical axis direction of the optical module.

14. The optical unit with a shake correction function according to claim 12, wherein the coil is held by an outer side face of the wall part, the magnet is held by an inner side face of the body part, and when viewed in an optical axis direction of the optical module, both of the outermost side faces of the coil in a direction along the wall part are protruded from the wall part in the direction along the wall part.

15. The optical unit with a shake correction function according to claim 12, wherein the swing support part comprises a contact spring and a contact spring holding part, and the contact spring holding part comprises a contact spring wall part which supports the contact spring in a direction intersecting an optical axis direction of the optical module.

16. The optical unit with a shake correction function according to claim 1, wherein the swing support part comprises a contact spring and a contact spring holding part, and the contact spring holding part comprises a contact spring wall part which supports the contact spring in a direction intersecting an optical axis direction of the optical module.

17. The optical unit with a shake correction function according to claim 16, wherein the contact spring holding part comprises a restriction part configured to restrict movement of the movable frame to the optical axis direction.

* * * * *